United States Patent [19]

Brüssel

[11] Patent Number: 5,045,250
[45] Date of Patent: Sep. 3, 1991

[54] METHOD OF APPORTIONING THE QUANTITY OF MATERIAL IN THE MANUFACTURE OF MOLDED PRODUCTS MADE FROM HARDENABLE MOLDING COMPOUNDS

[75] Inventor: Richard Brüssel, Sulzfeld, Fed. Rep. of Germany

[73] Assignee: Fried. Krupp Gesellschaft mit Beschränkter Haftung, Essen, Fed. Rep. of Germany

[21] Appl. No.: 363,997

[22] Filed: Jun. 9, 1989

[30] Foreign Application Priority Data

Jun. 11, 1988 [DE] Fed. Rep. of Germany ....... 3819916

[51] Int. Cl.$^5$ .......................................... B29C 43/58
[52] U.S. Cl. ..................... 264/40.4; 264/40.7; 264/152; 264/325; 264/40.5; 425/141; 425/142; 425/305.1
[58] Field of Search ............... 264/40.1, 40.5, 40.7, 264/148, 152, 160, 163, 331.18, 40.4; 425/140, 141, 142, 135, 163, 145, 305.1

[56] References Cited

U.S. PATENT DOCUMENTS

| | | | |
|---|---|---|---|
| 3,401,425 | 9/1968 | Fink | 425/140 |
| 3,542,629 | 11/1970 | Burkner | 425/217 |
| 3,555,127 | 1/1971 | Messer et al. | 264/40.7 |
| 3,621,518 | 11/1971 | Gallizia | 264/148 |
| 3,640,660 | 2/1972 | DeMets | 425/140 |
| 3,801,693 | 4/1974 | Stallings et al. | 264/331.18 |
| 4,009,225 | 2/1977 | Maxel | 264/331.18 |
| 4,076,780 | 2/1978 | Ditto | 264/40.5 |
| 4,289,467 | 9/1981 | Pesch | 425/141 |
| 4,307,050 | 12/1981 | Greten | 425/141 |
| 4,436,685 | 3/1984 | Emura | 264/148 |
| 4,470,787 | 9/1984 | Gram | 264/40.5 |
| 4,865,796 | 12/1989 | Tamura et al. | 264/40.7 |

FOREIGN PATENT DOCUMENTS

| | | | |
|---|---|---|---|
| 2427652 | 11/1975 | Fed. Rep. of Germany | 264/40.2 |
| 60-42023 | 3/1985 | Japan | 425/142 |
| 685496 | 9/1979 | U.S.S.R. | 264/40.1 |
| 939299 | 6/1982 | U.S.S.R. | 264/40.1 |

OTHER PUBLICATIONS

Plastics Technology, vol. 34, No. 12, "Goodyear Tries Total Automation for SMC Auto Body Panels", pp. 19-21, Nov. 1988.

*Primary Examiner*—Jeffery Thurlow
*Assistant Examiner*—Mathieu Vargot
*Attorney, Agent, or Firm*—Spencer & Frank

[57] ABSTRACT

A method of apportioning the quantity of material in the manufacture of molded products made from hardenable molding compounds in which a resin mat panel is cut into individual cut pieces which are stacked into mat packets and fed to the tool of a parallelism controlled press equipped with a path measuring system for measuring the distance between the clamping plates. The mat packets are compacted to become the molded products. A constant molded product volume is realized by measuring the thickness of the molded product at a defined point in time by means of the path measuring system and the measured values are used as regulating values for regulating the size of the cut area of each cut piece.

14 Claims, 2 Drawing Sheets

METHOD OF APPORTIONING THE QUANTITY OF MATERIAL IN THE MANUFACTURE OF MOLDED PRODUCTS MADE FROM HARDENABLE MOLDING COMPOUNDS

REFERENCE TO RELATED APPLICATIONS

This application claims the priority of Federal Republic of Germany application Ser. No. P 38 19 916.5 filed June 11, 1988, which is incorporated herein by reference.

BACKGROUND OF THE INVENTION

The present invention relates to a method of apportioning a quantity of material in the manufacture of molded products made from hardenable molding compounds. In such a method, a resin mat panel is cut into mats and the individual cut pieces are combined into mat packets and fed into the tool of a parallelism controlled press equipped with a path measuring system for measuring the distance between the clamping plates and the two tool halves, respectively, with the mat packets being compacted to become the molded products.

A programmable velocity and force controller for a press of this type is known, for example, from U.S. Pat. No. 4,076,780. The press disclosed in that patent includes four measuring sensors each attached at a corner of the press table supporting the lower mold half so as to determine the distance from the press table, and the parallelism of the press ram carrying the upper mold half and these measurements are used to control the press velocity and press force by means of a bracing system. For this purpose, the path measuring system composed of the four measuring sensors is connected with a control system which controls the hydraulic bracing elements at the four corners of the press table by way of servo controlled hydraulic valves to act against the press force introduced by way of the press ram. In this way, porous locations in the finished molded product caused by inaccurate guidance of the press ram can be avoided.

To be able to economically perform the processing of hardenable molding compounds (so-called SMC=sheet molding compounds) into molded products by means of pressing, it is desirable to substantially automate the system. This applies particularly for the processing steps between the resin mat as the preliminary material and the finished molded product. In the prior art processes, the foil-coated resin material supplied on a reel is unwound, the foil coating is removed and then the resin material is cut to size. Thereafter, the cut pieces are weighed and, grouped in packets or, more precisely, apportioned, before they are introduced into the press. After removal of the finished molded product from the pressing tool, the molded product must possibly still be deburred.

However, in the described processing steps, the consistency of the resin mats poses problems. The maximum or minimum weight per unit area of the resin mat often deviates greatly, sometimes considerably more than five percent, from the ideal average value. This may lead to considerable fluctuations in the thickness of the molded product and also to considerable burr formation on the molded product.

It is known to weigh the resin mat packet for a molded product and to compensate shortfalls in weight or excess weight by the addition or removal of material (corrections in the cut pieces). However, this does not consider specific weight tolerances of the individual cut resin mats stacked into mat packets and, because of the resulting differences in volume, this may lead to greater differences in thickness between one molded product and the next.

It is also known in the art to individually weigh the cut resin mat layers (cut pieces) and to correct the surface area of the resin mat layers to be cut thereafter, if there are discrepancies in weight. Although this makes it possible to keep deviations in weight at a minimum for the individual resin mat packets, it is impossible—in spite of the considerable expenditures for this method—to also consider the differences in volume in the cut resin mats. Moreover, other effects depending on the pressing process such as, for example, differences in burr formation on the finished molded products on the basis of differences in press forces also remain unconsidered.

SUMMARY OF THE INVENTION

It is therefore an object of the present invention to provide measures for a method of the above-mentioned type with which an unchanging volume of the molded products is ensured in a substantially automated process with substantially unchanging quality and freedom from pores.

This is accomplished in that the thicknesses of the molded products are measured by means of the path measuring system of the press at a defined point in time and the measured value (values) is (are) used as a regulating variable for the size of the cut area.

The method according to the invention has the primary advantage that, due to the cut resin mat pieces being apportioned exclusively in a volumetric manner, weighing of the cut resin mat pieces is no longer necessary, thus eliminating the requirement for a weighing station.

The novel method utilizes the fact that in the prior art presses, which are controlled to run with the mold halves in parallelism and in which the velocity and the force of the press ram and also of the chargeable press table are regulated, a path measuring system is included in the form of path measuring sensors. In the course of parallelism regulation, the signals from this path measuring system are directed to an electro-hydraulic servo valve system which directly compensates the tilting moments resulting, for example, from forces arising within the mold and acting on the press ram, and thus ensures great parallelism of the table and ram clamping surfaces during press travel. The measured values obtained there are now utilized according to the invention, in addition to their original use, to regulate the size of the cut areas.

Which dimensions of the cut area are utilized for this purpose may depend on the geometric shape of the cut piece which will generally, but not always, be rectangular. With rectangular shapes, the regulation may be accomplished in a simple manner in that the drive of a feed apparatus for the resin mat panel is controlled by the control circuit to set the size of the cut piece. This drive is controlled to determine the magnitude of the advancement of the resin mat panel before each piece is cut and thus to determine the width dimension of the respective cut piece. The measured values from the path measuring system for determining the advancement of the resin mat panel are preferably used at the feed apparatus, or may be used indirectly by way of an angle decoder disposed at the motor shaft which drives a roller so as to unwind the resin mat panel from its reel.

The fact that, in this manner of control, the adjustment of the size of the cut area is made only at the time of cutting a next cut piece after the measurement of molded product thickness is taken, or at the time of cutting the cut piece following thereafter, will not be disadvantageous even with large weight per unit area tolerances for the resin mat panel. In resin mat panels available in the trade there generally do not occur any abrupt fluctuations but only those in which slight increases or decreases in specific weight, weight per unit area or thickness extend over a path of a relatively great length and thus it is easily possible to effectively take the control measures.

According to a preferred embodiment of the invention, an adaptive control circuit is used whereby a measured thickness of the molded product is compared with a given desired value and a correction value is determined from the difference and is used to adjust a control signal which is in turn used to control the size of the cut area. At the time of each cut, the actual length of the cut piece is determined by conventional means and compared to the control signal, and the control signal is adjusted to further refine the size of the next piece. Thus, by iterative use of the inventive method, it is possible in this way to gradually optimize the size of the cut area by adjusting the control signal so that the thickness of the molded product can be regulated with increasing precision.

Preferably, the control signal is repeatedly corrected and utilized as an input signal for the drive mechanism to advance the resin mat panel.

Preferably, the thickness of the molded product is measured at the four corners of the clamping surface of the press and the average calculated therefrom is used in calculating the regulation value of the regulation signal. According to another feature of the invention, the thickness of the molded product is measured by means of high resolution digital/incremental measuring sensors.

It is further proposed to measure the thickness of the molded product at the end of the hardening (curing) period. This has the advantage of even greater accuracy because in this way consideration is given to the fact that the thickness of the molded product may change in the course of the hardening period.

Further advantages result from the fact that specific deformations of the tool of the press, such as would be caused by the resilience and thermal expansion characteristics of the press, are measured and included in the regulating process as additional correction values. In this way a more accurate determination is made of the thickness of the molded product as represented by the corrected basic (regulation) value for the size of the cut area.

BRIEF DESCRIPTION OF THE DRAWINGS

These and other features and advantages of the invention can be more completely understood from the following detailed description with reference to the accompanying drawings in which.

DETAILED DESCRIPTION OF THE PREFERRED EMBODIMENT

Figure 1:
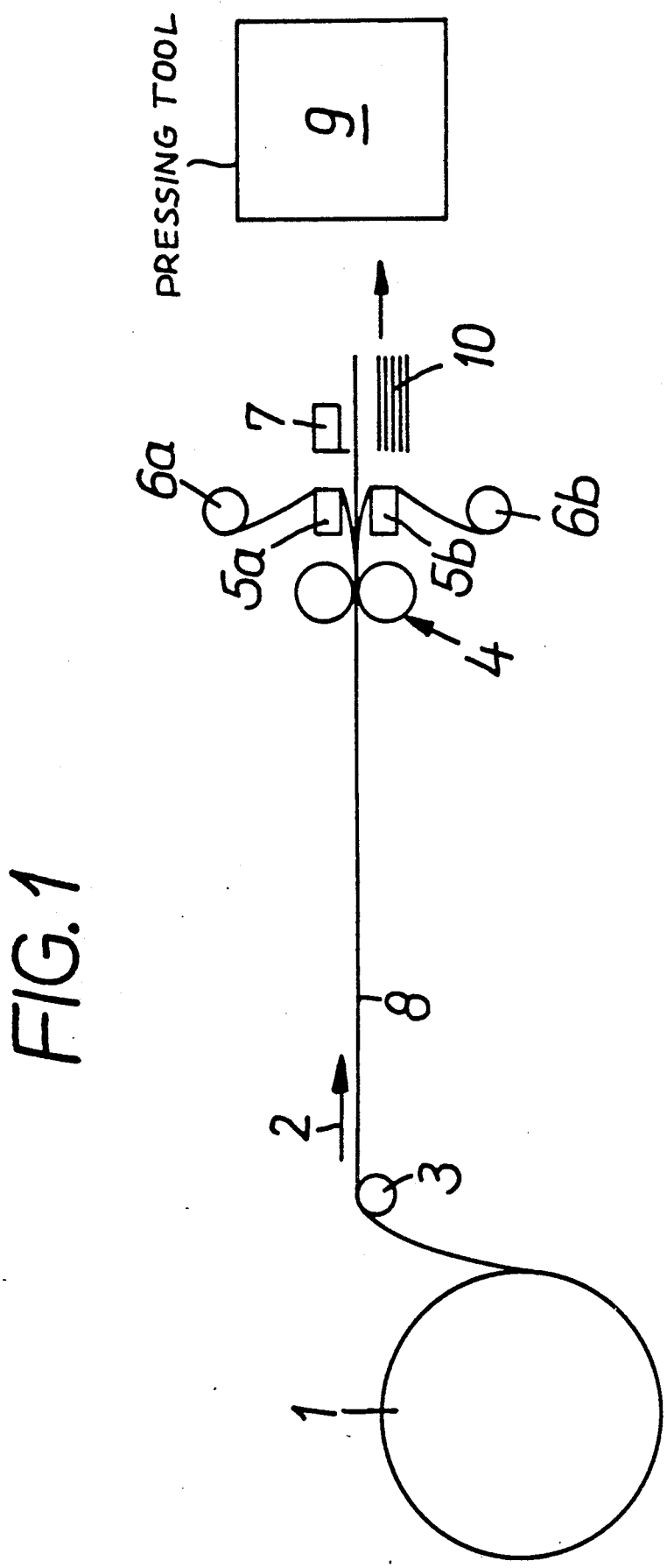
FIG. 1 is a schematic representation of a resin mat feeding device.

As shown in FIG. 1, a resin mat panel 8 of uniform width is unwound from a resin mat coil 1 in the direction (longitudinal direction) of arrow 2 and is conducted by way of a guide roller 3 into a feed apparatus 4 provided with rollers in a resin mat cutting machine. The feed apparatus transports the resin mat panel clamping jaws 5a and 5b after removal from both sides of foil by reels 6a and 6b. Clamping jaws 5a and 5b are preferably actuated pneumatically and clamp resin mat panel 8 in on both sides during the transverse cutting operation effected by a cutting device 7 moving transversely to the direction in which the resin mat panel is transported. The cut-off pieces are collected by a device (not shown) and fed, as a stacked packet of cut pieces 10, to a pressing tool 9.

Figure 2:
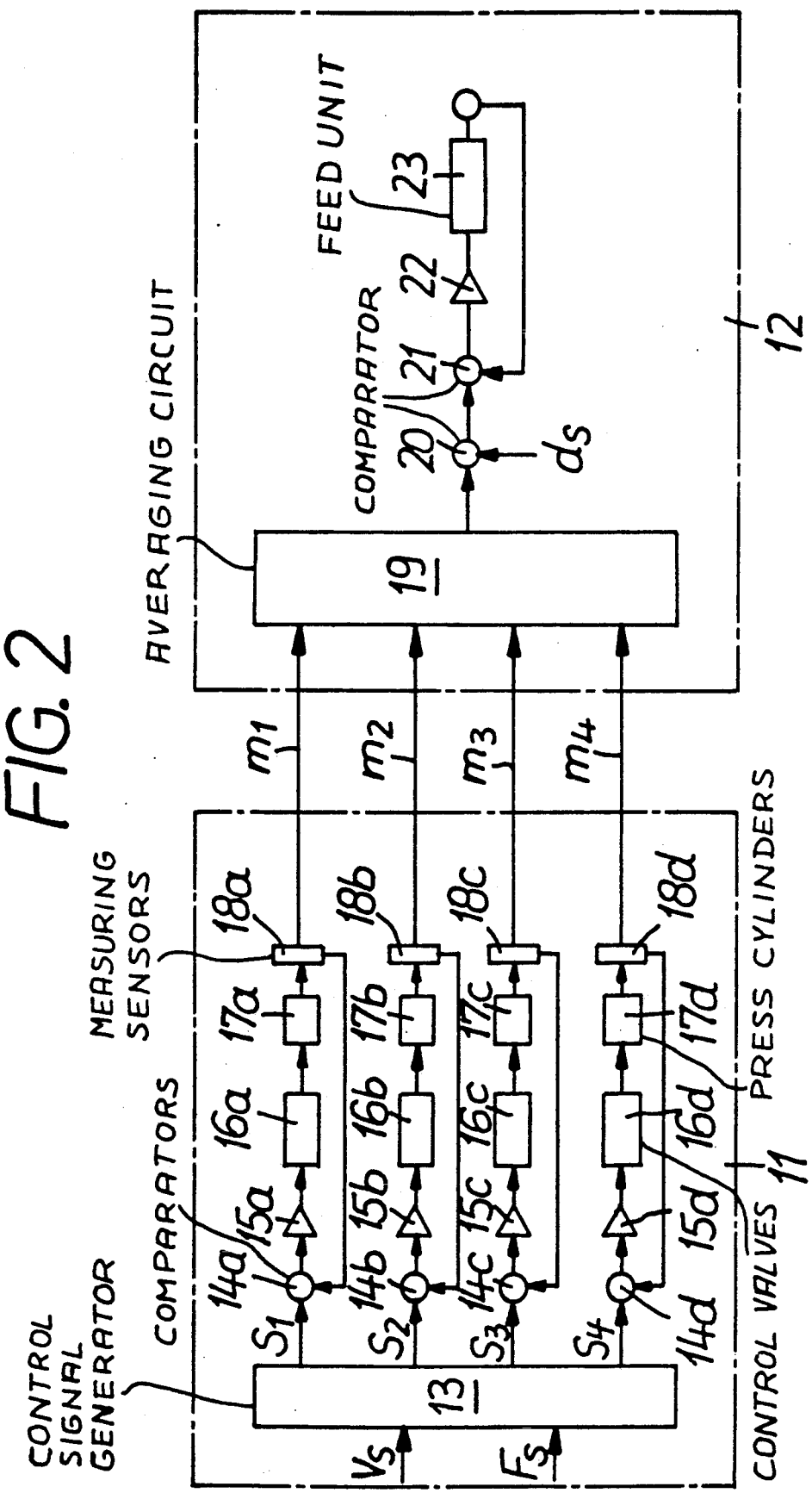
FIG. 2 is the associated control diagram.

As can be seen in FIG. 2, a control circuit 11 for controlling the press force, the pressing velocity and the parallelism of the molding tools is linked with a control circuit 12 for controlling the thickness of the molded product in such a manner that the measured values for the thicknesses of the molded products are processed by both control circuits 11 and 12. The numeral 13 designates a circuit element (control signal generator) which identifies from the pressing velocity $v_s$ and the press force $F_s$ the desired control signals for cylinders at the four corners of the press. Under consideration of these given inputs, corresponding control signals $s_1$ to $s_4$ are fed by way of comparators 14a to 14d associated with them and signal amplifiers 15a to 15d connected with the respective comparator outputs, to the control valves 16a to 16d of four press cylinders 17a to 17d whose piston rods act on the press ram. The electro-mechanical structures of the press, including the control valves 16a–16d, press cylinders 17a–17d and press ram are suitable like those described in the above mentioned U.S. Pat. No. 4,076,780.

Each one of press cylinders 17a to 17d of the press (not shown) is associated with one of the four corners of the table surface outside of the active tool area of the press, e.g., the area occupied by a lower mold half and a heat plate, and is configured as a short-stroke bracing cylinder. Each one of these bracing cylinders is provided with an incremental path measuring system which is likewise disposed at the four corners of the table surface or of the clamping plate and which is suitably of the type described in U.S. Pat. No. 4,076,780. The distances measured by measuring sensors 18a to 18d of the path measuring system and processed as measured values provide a criterion for the parallelism of the press and for the deviations therefrom, and simultaneously a measure of the momentary thickness of the molded product.

As in the press parallelism control employed in the prior art, the measured values obtained from measuring sensors 18a to 18d in accordance with the invention are returned to comparators 14a to 14d (so-called feedback connection) and are utilized to correct the momentary press force and the momentary pressing velocity. However, in accordance with the invention the measured values are also output as measurement signals $m_1$ to $m_4$ to the thickness control circuit 12 for the purpose of molded product thickness regulation.

The measurement signals $m_1$ to $m_4$ for the thickness of the molded product obtained, for example, at the end of the hardening period are fed to an average former 19 which feeds the calculated average to a comparator 20 where this average is compared with a fed-in desired thickness $d_s$. From this, a new regulation signal having a new, corrected basic (regulation) value is formed for controlling the size of the cut area of the cut pieces 10 to be transported to the press 9, in particular for controlling the length of advancement of the cut resin mat panel 8 in the direction 2 prior to each cut, and this signal is fed to a connected comparator 21, a signal amplifier 22 and finally, as the control signal, to an electromechanical feed unit 23 which controls the drive of the rollers of feed apparatus 4. The respective actual feed length and thus the momentary dimensions of the cut piece, is monitored (measured) by conventional means at the feed apparatus 4 of the resin mat cutting machine or alternatively at a display device for the angle decoder position at the drive for resin mat coil 1 and the respective measured value is are returned to comparator 21 for use in determining the next control signal to the feed unit 4. Thus, the cut area is gradually changed iteratively until the desired thickness for the molded product is attained.

The position of the cuts in the resin mat panel made by cutting device 7 is in this wa determined by the above described regulation of the advancing movement. At the beginning of processing of the resin mats in the manufacture of the molded products, several basic values must be predetermined for the regulation on the basis of which a higher order computer subsequently calculates the necessary dependent values. These basic values include the ideal resin mat weight per unit area, the desired values for the weight of the molded product and for the thickness of the molded product and possibly also the dimension of the resin mat panel measured transversely to the direction of advancement.

Advisably, the entire press and cut piece control is performed according to a control program stored in memory.

It will be understood that the above description of the present invention is susceptible to various modifications, changes and adaptations, and the same are intended to be comprehended within the meaning and range of equivalents of the appended claims.

What is claimed is:

1. A method of successively molding a plurality of products, each with a quantity of a molding material formed of hardenable resin molding compounds, the molding of each product comprising the steps of:
   cutting a resin mat panel into a plurality of individual cut pieces;
   combining the plurality of pieces into a packet;
   feeding the packet into a tool of a parallelism controlled press having two clamping plates and two tool halves and equipped with a path measuring system;
   compacting the packet between the tool halves to form the product; and
   determining a thickness of the product, said step of determining the thickness including the step of measuring with the path measuring system a distance between the clamping plates and the two tool halves, respectively, at a defined point in time, with the packet being compacted to become the product; said step of cutting including the step of cutting the pieces to a size as a function of a desired thickness of the product and the thickness determined during the molding of a previously molded product.

2. A method as defined in claim 1, wherein said step of cutting includes the steps of advancing a resin mat panel of uniform width in a given direction transverse to the width an amount which is based on the determined thickness of the product, and cutting the pieces in the width direction.

3. A method as defined in claim 1, wherein said step of cutting includes the steps of comparing the determined thickness of the product with the desired thickness, determining a correction value from the difference between the determined thickness of the product with the desired thickness, and modifying the size of the pieces to be cut for the following packet based on the correction value.

4. A method as defined in claim 2, wherein said step of cutting includes the steps of comparing the determined thickness of the product with the desired thickness, determining a correction value from the difference between the determined thickness of the product with the desired thickness, and modifying the size of the pieces to be cut for the following packet based on the correction value.

5. A method as defined in claim 4, wherein the step of advancing a resin mat panel comprises the step of inputting to a drive for advancement of the resin mat panel a control signal indicative of the correction value determined during said step of determining the correction value.

6. A method as defined in claim 1, wherein said step of determining the thickness of the product from the measurement of the distance between the clamping plates and the two tool halves, comprises the step of measuring the thickness of the product at the four clamping surface corners of the press and calculating an average therefrom, said step of cutting including the step of cutting pieces to a size as a function of the desired thickness and the average determined during said step of calculating an average.

7. A method as defined in claim 6, wherein the thickness of the product is measured with high resolution digital/incremental measuring sensors.

8. A method as defined in claim 1, further comprising the step of hardening the product in the press, wherein the defined point in time at which the thickness of the product is measured is at the end of the step of hardening.

9. A method as defined in claim 1, wherein said step of determining includes the step of determining deformation of the press tool with the packet compacted between the tool halves.

10. A method as in claim 9, wherein the deformations determined during said step of determining, includes resilient deformations and thermal deformations.

11. A method as in claim 3, wherein the distance is measured in a region of the tool adjacent to the mold and is utilized as the regulating value for determining the correction value.

12. A method as defined in claim 1, wherein said step of cutting includes the steps of comparing the thickness of the previously molded product to the desired thickness and cutting the pieces to a size based on the comparison.

13. A method as defined in claim 1, wherein said step of cutting includes the steps of:
   calculating, based on the determined thickness, a size of the cut pieces necessary to produce the product with a thickness equal to the desired thickness, and cutting the pieces to the calculated size, whereby the thicknesses of the successively molded products approach the desired thickness.

14. A method as defined in claim 5, further comprising the steps of:
measuring a length of the advancement of the resin mat panel during said step of advancing,
comparing the measured length to the control signal, and
adjusting the control signal to be input to the drive for a next advancement of the resin mat panel based on the comparison of the measured length to the control signal in order to further refine the size of the next piece to be cut.

* * * * *